United States Patent
Hwang et al.

(10) Patent No.: US 6,649,132 B1
(45) Date of Patent: Nov. 18, 2003

(54) PROCESS FOR THE REMOVAL OF IMPURITIES FROM GAS STREAMS

(75) Inventors: Shuen-Cheng Hwang, Chester, NJ (US); Neeraj Saxena, Murray Hill, NJ (US); Naresh Suchak, Ridgewood, NJ (US); Robert J. Ferrell, Rutherford, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 10/201,335

(22) Filed: Jul. 23, 2002

(51) Int. Cl.[7] .............................................. B01D 53/34
(52) U.S. Cl. ................. 423/210; 423/215.5; 423/242.1; 423/235; 204/174; 204/177
(58) Field of Search ............................. 423/210, 215.5, 423/242.1, 235, 393, 394, 522; 204/174, 177

(56) References Cited

U.S. PATENT DOCUMENTS

| | | | |
|---|---|---|---|
| 4,011,298 A | * 3/1977 | Fukui et al. ................. | 423/235 |
| 5,206,002 A | 4/1993 | Skelley et al. ............... | 423/235 |
| 5,233,934 A | 8/1993 | Krigmont et al. ............ | 110/345 |
| 5,316,737 A | 5/1994 | Skelley et al. ............... | 422/170 |
| 5,743,929 A | 4/1998 | Kapoor et al. .............. | 65/134.6 |
| 5,871,703 A | 2/1999 | Alix et al. ................... | 423/210 |
| 5,985,223 A | 11/1999 | Saxena et al. ............... | 423/235 |
| 6,117,403 A | 9/2000 | Alix et al. ................... | 423/210 |
| 6,132,692 A | 10/2000 | Alix et al. ................... | 423/210 |
| 6,136,284 A | 10/2000 | Hwang et al. ............... | 423/235 |
| 6,197,268 B1 | 3/2001 | Hwang et al. ............... | 423/235 |
| 6,277,347 B1 | * 8/2001 | Stearns et al. .......... | 423/240 R |

* cited by examiner

Primary Examiner—Stanley S. Silverman
Assistant Examiner—Timothy C. Vanoy
(74) Attorney, Agent, or Firm—Philip H. Von Neida

(57) ABSTRACT

The present invention relates to a process for removing nitrogen oxides, sulfur dioxides and mercury from gas streams such as furnace or utility boiler flue gas streams, particularly those derived from coal-fired utility boilers. A stream containing relatively low concentration of ozone from an ozone concentrator is feed to a barrier discharge reactor. Nitrogen oxides and mercury in the flue gas are oxidized by oxygen and hydroxyl radicals formed in the reactor. The flue gas is then directed to a reactor duct along with the ozone at a greater concentration wherein the remaining nitrogen oxides and mercury in the gas stream will react with the ozone to form nitric acid, nitric acid precursors, mixtures thereof and mercuric oxide. These impurities can then be removed from the gas stream by use of an aqueous scrubber, a wet electrostatic precipitator, a dry scrubber or a semi-dry scrubber.

17 Claims, 1 Drawing Sheet

PROCESS FOR THE REMOVAL OF IMPURITIES FROM GAS STREAMS

FIELD OF THE INVENTION

The present invention relates to a process for removing impurities from flue gas streams utilizing ozone. More particularly, the present invention provides for means to remove nitrogen oxide, sulfur oxide and mercury from flue gas streams.

BACKGROUND OF THE INVENTION

Recent federal and local environmental laws require very significant reduction of discharge of harmful gaseous substances into the atmosphere. Chief among such harmful air pollutants are nitrogen oxides ($NO_x$). In response to strict enforcement efforts of these laws, industrial air polluters have made considerable efforts to reduce the amount of these harmful substances into the air in gaseous effluents from industrial or municipal sources. Successful efforts to reduce the concentration of $NO_x$ in gaseous effluents often involve reacting the $NO_x$ in waste gases with nitrogen-based reducing agents. One commercially used method of reducing $NO_x$ from gas streams involves contacting the $NO_x$ with ammonia or an ammonia precursor, such as urea, in the absence of a catalyst, a technique known as selective non-catalytic reduction (SNCR). The ammonia reduces the $NO_x$ to nitrogen while itself being oxidized to nitrogen and water. SNCR processes require very high temperatures, for instance temperatures in the range of about 800 to 1200° C., and even at these temperatures only low conversions of $NO_x$ are achieved. For example, it is not uncommon to attain $NO_x$ reductions only in the range of 40 to 50% by SNCR-based processes.

Another technique for removing $NO_x$ from waste gas streams involves contacting the waste gas with ammonia or an ammonia precursor in the presence of a substance which catalyzes the reduction of $NO_x$ to nitrogen, as in SNCR processes. These catalytic reduction processes are referred to as selective catalytic reduction (SCR). SCR processes have a few advantages over SNCR processes. They can be carried out at temperatures significantly lower than the temperatures at which SNCR processes are carried out. For example, they are quite effective at temperatures in the range of about 250 to 600° C. Although SCR processes are more efficient than SNCR processes in the reduction of $NO_x$ to nitrogen, they have the disadvantages of being more costly than SNCR processes, the catalyst can be poisoned or deactivated and often they do not remove all of the $NO_x$ from the gas stream being treated.

Another disadvantage of both SCR and SNCR processes is that ammonia, which itself is regarded as an environmentally unacceptable pollutant, is often released into the atmosphere in the gaseous effluent from the reactor because the reactions are often conducted in the presence of excess ammonia and/or because of sudden changes in the process that produces less than expected $NO_x$. Ammonia may also be released because of depletion or masking of the catalyst by contamination over time.

Another known method of removing $NO_x$ from gas streams involves contacting the $NO_x$ with ozone or with oxygen and hydroxyl radicals generated with barrier discharge, thereby oxidizing them to higher nitrogen oxides, such as $N_2O_5$ and removing the higher oxides from the gas stream by means of aqueous scrubbers.

Specific details of ozone-based $NO_x$ oxidation processes are disclosed in U.S. Pat. Nos. 5,206,002 and 5,316,737, the disclosures of which are incorporated herein by reference. Ozone-based $NO_x$ oxidation processes can be expensive because of the high cost of producing ozone and require efficient use of ozone to reduce costs.

Barrier discharge technology is disclosed in U.S. Pat. Nos. 5,871,703 and 6,117,403. However the efficiency of this technology is relatively low, about 70 to 80% for $NO_x$, 40 to 50% for $SO_x$ and 60 to 85% for mercury.

Because of stringent environmental regulations, efforts are continuously made to improve $NO_x$ removal processes to minimize or eliminate emission of $NO_x$ into the atmosphere. Additionally, the Environmental Protection Agency has presented information showing mercury levels in the environment are at levels that are likely to lead to adverse health effects. Coal-fired utility boilers are one of the largest sources of harmful anthropogenic mercury emissions but also include the $NO_x$, and $SO_x$ emissions sources. The present inventors have discovered a process whereby by improving the barrier discharge technology, mercury as well as $NO_x$ and $SO_x$ can be removed in excess of 95% from the emission from coal-fired utility boiler flue gas.

SUMMARY OF THE INVENTION

The present invention provides for a process for removing nitrogen oxides, sulfur oxides and mercury from a gas stream comprising the steps of (1) feeding the gas stream into a dry electrostatic precipitator to remove dust and particulates from the gas stream; (2) contacting the gas stream with ozone, oxygen and hydroxyl radicals generated in a barrier discharge; (3) contacting the gas stream with ozone in a reaction zone to convert the nitrogen oxides to nitric acid, nitric acid precursors and mixtures thereof, and to convert the mercury to mercuric oxide; and (4) feeding this gas stream into an aqueous scrubber thereby removing the nitric acid, nitric acid precursors, sulfur oxides and the mercuric oxide resulting in a cleaner gas stream for emission to the atmosphere.

DETAILED DESCRIPTION OF THE INVENTION

Figure 1:
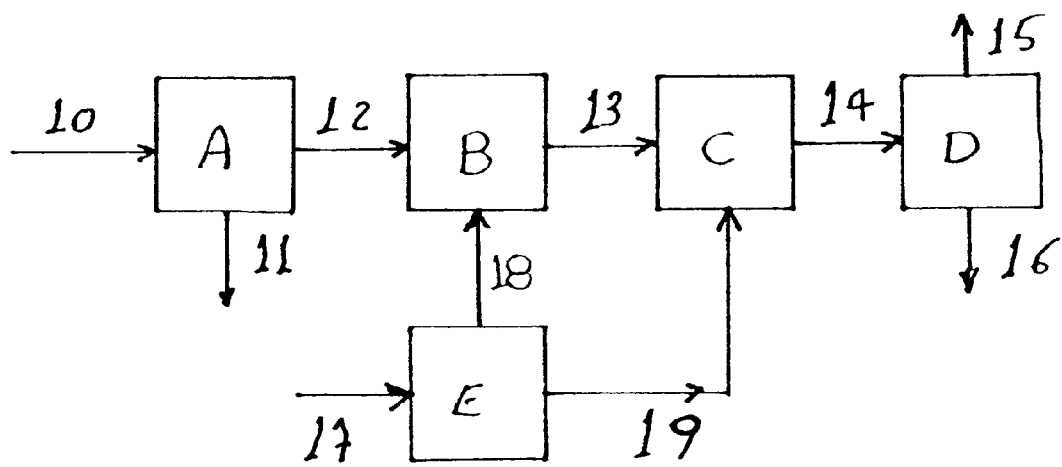
FIG. 1 is a schematic representation of an embodiment of a gas purification system under which the present invention can be practiced.

The present invention provides for a process for removing impurities which consist essentially of nitrogen oxides, sulfur oxides and mercury from a gas stream which comprises the steps of (1) feeding the gas stream into a dry electrostatic precipitator to remove dust and particulates from the gas stream; (2) feeding this gas stream into a barrier discharge reaction zone whereby the nitrogen oxides and the mercury are oxidized to nitric acid, nitric acid precursors and mixtures thereof, sulfuric acid, sulfuric acid precursors and mixtures thereof, and mercuric oxide, respectively, by oxygen and hydroxyl radicals; (3) feeding the gas stream into a further reaction zone along with ozone whereby the nitrogen oxides and mercury remaining in the gas stream are reacted to form nitric acid, nitric acid precursors and mixtures thereof, sulfuric acid, sulfuric acid precursors and mixtures thereof, and mercuric oxide; and (4) feeding the gas stream which is now essentially free of lower order nitrogen oxides and mercury to a wet electrostatic precipitator or scrubber to remove the reaction products thereby allowing emission of the gas stream into the atmosphere or recycled for other uses. For a more detailed description of the invention, reference is made to FIG. 1.

A gas stream containing impurities such as nitrogen oxides, sulfur oxides and mercury enters through line 10 where it connects with an electrostatic precipitator A which acts to remove from the feed gas stream dust and particulates which are discharged through line 11. The dust free and particulate free feed gas stream is then fed through line 12 to a barrier discharge reactor B which is fed from the ozone concentrator E a stream containing relatively lower concentration ozone in the range of up to about 6% by weight ("low concentration") through line 18. Line 17 is the feed line into the ozone concentrator E providing oxygen and ozone mixture generated by an ozone generator. Typically, the ozone-containing stream from the ozone generator comprises about 3 to 12% by weight ozone with balance being oxygen. The ozone concentrator E will generate an ozone concentrated ("ozone-rich") stream 19 with up to about 18% by weight of ozone. The impurities in the feed gas stream will react with the oxygen and hydroxyl radicals generated in the barrier discharge reactor B and this will convert a certain portion of the nitrogen oxides to nitric acid, nitric acid precursors and mixtures thereof. A certain percentage of the sulfur oxides will also be converted to sulfuric acid, sulfuric acid precursors and mixtures thereof and a certain percentage of the elemental mercury to mercuric oxide.

Line 19 exits the ozone concentrator and contains ozone at a greater concentration than that which was fed through line 18. This ozone with the greater concentration is fed to the reactor C. Line 13 connects the barrier discharge reactor B with the reaction duct C. The ozone present in the reaction duct will further react with the impurities not already reacted in the barrier discharge reactor. Typically, about 70 to 80% of the $NO_x$ is reacted in the barrier discharge reactor while 40 to 50% of the $SO_x$ and 68 to 82% of the mercury originally present in the feed gas stream react in the barrier discharge reactor.

In the present invention, the feeding of a higher concentrate ozone through line 19 to reaction duct C will cause more of the nitrogen oxide, sulfur oxides and mercury to react such that greater than 95% of all three classes of impurities are converted into water-soluble substances. The gas stream which now contains greatly soluble impurities such as nitric acid, nitric acid precursors, sulfuric acid, sulfuric acid precursors and mercuric oxide is feed through line 14 to a scrubber assembly D.

The scrubbed gas stream, which is now free of these impurities, passes through line 15 into the atmosphere or is recycled to another portion of the facility generating the original gas stream. Line 16 is the discharge line from the aqueous scrubber whereby the acids and the mercuric oxide are discharged. Line 20 enters the scrubber and is responsible for providing fresh caustic solution to the aqueous scrubber. The scrubber may be any suitable vessel and can be equipped with baffling or an inert material to enhance contact between the scrubbing liquid and the gas that is being purified.

The aqueous liquid scrubbing step is preferably carried out at a pH greater than 7 and is most preferably carried out at a pH greater that 9. The aqueous liquid may be water in which case a dilute aqueous nitric acid solution will be produced. However, in preferred embodiments, the aqueous liquid is a dilute basic solution. Suitable basic aqueous solutions include alkali metal hydroxides such as sodium hydroxide, potassium hydroxide, etc., and alkaline earth metal hydroxides such as calcium hydroxide, magnesium hydroxide, etc. and ammonium hydroxide. Preferably, the aqueous solution contains a base having good water solubility such as sodium hydroxide, potassium hydroxide, ammonium hydroxide, etc. Most preferably, the caustic solution is aqueous sodium hydroxide, which is readily available, relatively inexpensive and produces environmentally acceptable products upon reaction with the flue gas components.

The temperature and pressure at which the aqueous scrubbing step is carried out are not critical. This step is typically carried out at a temperature in the range of about 10° to about 90° C. and is more preferably carried out at a temperature in the range of about 20° to about 60° C. Typically, the scrubbing step is carried out at atmospheric pressure and the scrubbing liquid can be introduced either in the form of a spray if the scrubber is a hollow chamber or a trickle stream if the scrubber is packed with inert packing. The scrubbing liquid washes out the $N_2O_5$ and/or nitric acid from the gas being treated. This subsequently passes out through line 6 to be disposed of in an environmentally proper fashion.

Indeed, it is also possible to accomplish removal of the impurities through the use of a wet electrostatic precipitator, a semi-dry or a dry scrubber which operate at different conditions than listed above.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what we claim is:

1. A process for removing nitrogen oxides, sulfur oxides and mercury from a gas stream comprising the steps:
    (a) feeding said gas stream into a dry electrostatic precipitator thereby removing dust and particulates from said gas stream;
    (b) feeding said gas stream and a low-concentration ozone stream from an ozone concentrator into a barrier discharge reaction zone whereby said nitrogen oxides and mercury are oxidized to nitric oxide and mercuric oxide, respectively;
    (c) feeding ozone-rich stream from an ozone concentrator and said gas stream into a reaction zone whereby said nitrogen oxides and mercury remaining in said gas stream are reacted to form nitric acid, nitric acid precursors and mixtures thereof, and mercuric oxide; and
    (d) feeding said gas stream to an aqueous scrubber whereby said nitric oxides, sulfur oxides, mercuric oxides, nitric and sulfuric acids and their precursors, mixtures thereof and mercuric oxide are removed from said gas stream.

2. The process as claimed in claim 1 wherein said nitrogen oxides are selected from the group consisting of nitric oxide and nitrogen dioxide.

3. The process as claimed in claim 1 wherein said gas stream is a flue gas stream.

4. The process as claimed in claim 3 wherein said flue gas stream is from a furnace or utility boiler flue gas stream.

5. The process as claimed in claim 1 wherein said gas stream further comprises sulfur oxides.

6. The process as claimed in claim 1 wherein said ozone is delivered from an ozone generator.

7. The process as claimed in claim 1 wherein said aqueous scrubber contains an aqueous basic solution.

8. The process as claimed in claim 6 wherein said ozone from an ozone generator is about 3 to about 12% by weight ozone.

9. The process as claimed in claim 1 wherein about 70 to 80% of nitrogen oxide and 68 to 82% of mercury are reacted in step (b).

10. The process as claimed in claim 1 wherein about 95% of nitrogen oxides, sulfur oxides and mercury present in said gas stream are removed.

11. The process as claimed in claim 1 wherein said gas stream is from a coal-fired boiler.

12. The process as claimed in claim 1 wherein step (d) comprises feeding said gas stream to a wet electrostatic precipitator.

13. The process as claimed in claim 1 where in step (d) comprises feeding said gas stream to a semi-dry scrubber.

14. The process as claimed in claim 1 where in step (d) comprises feeding said gas stream to a dry scrubber.

15. The process as claimed in claim 1 wherein the ozone concentration in step (b) is about 0 up to about 6% by weight.

16. The process as claimed in claim 1 wherein the ozone concentration in step (c) is about 10 to about 18%.

17. The process as claimed in claim 1 wherein said gas stream is vented to the atmosphere after removal of the nitrogen oxides and mercury.

* * * * *